(12) United States Patent
Duis et al.

(10) Patent No.: US 9,178,620 B2
(45) Date of Patent: *Nov. 3, 2015

(54) OPTICAL INTERFACE FOR BIDIRECTIONAL COMMUNICATIONS

(71) Applicant: TYCO ELECTRONICS NEDERLAND BV, 's-Hertogenbosch (NL)

(72) Inventors: Jeroen Antonious Maria Duis, Didam (NL); Jan Willem Rietveld, Benschop (NL); Joseph Gerardus Maria Vos, Elsendorp (NL)

(73) Assignee: TE Connectivity Nederland B.V. (NL)

( * ) Notice: Subject to any disclaimer, the term of this patent is extended or adjusted under 35 U.S.C. 154(b) by 181 days.

This patent is subject to a terminal disclaimer.

(21) Appl. No.: 13/623,479

(22) Filed: Sep. 20, 2012

(65) Prior Publication Data

US 2013/0094864 A1    Apr. 18, 2013

Related U.S. Application Data

(60) Provisional application No. 61/538,241, filed on Sep. 23, 2011.

(51) Int. Cl.
*H04B 10/40* (2013.01)
*G02B 6/26* (2006.01)
(Continued)

(52) U.S. Cl.
CPC .............. *H04B 10/40* (2013.01); *G02B 6/4246* (2013.01); *G02B 6/29367* (2013.01); *G02B 6/3885* (2013.01)

(58) Field of Classification Search
CPC .. H04B 10/40; G02B 6/4246; G02B 6/29367; G02B 6/3885
USPC ................................. 398/115–118, 135–139
See application file for complete search history.

(56) References Cited

U.S. PATENT DOCUMENTS

| | | | |
|---|---|---|---|
| 4,566,761 | A | 1/1986 | Carlsen et al. |
| 5,325,455 | A | 6/1994 | Henson et al. |

(Continued)

FOREIGN PATENT DOCUMENTS

| | | |
|---|---|---|
| CN | 1350653 A | 5/2002 |
| CN | 1779970 A | 5/2006 |

(Continued)

OTHER PUBLICATIONS

International Search Report, International Application No. PCT/US2012/056592, International Filing Date Sep. 21, 2012.

(Continued)

*Primary Examiner* — Leslie Pascal

(57) ABSTRACT

An optical interface comprising a first portion having at least one optical conduit interface with a first axis for optically coupling with at least one optical conduit, a second portion having at least one transmitter interface with a second axis for optically coupling with a transmitting optical device, and at least one receiver interface with a third axis for optical coupling with a receiving optical device, the first, second and third axes being essentially parallel; and a wavelength filter element (WFE) disposed between the first and second portions, the WFE defining a first optical path between the transmitter interface and the optical conduit interface, and a second optical path between the optical conduit interface and the receiver interface.

30 Claims, 9 Drawing Sheets

(51) Int. Cl.
*G02B 6/42* (2006.01)
*G02B 6/38* (2006.01)
*G02B 6/293* (2006.01)

(56) References Cited

U.S. PATENT DOCUMENTS

| | | |
|---|---|---|
| 6,366,723 B1 | 4/2002 | Medved et al. |
| 6,671,435 B2 | 12/2003 | Medved et al. |
| 2003/0025962 A1 | 2/2003 | Nishimura |
| 2003/0219213 A1 | 11/2003 | Blarasin et al. |
| 2006/0110110 A1 | 5/2006 | Yi et al. |
| 2008/0025676 A1 | 1/2008 | Wang |
| 2008/0285974 A1* | 11/2008 | Takahashi et al. ............... 398/87 |
| 2009/0052909 A1* | 2/2009 | Hino et al. .................... 398/200 |
| 2009/0154137 A1 | 6/2009 | Bierhuizen et al. |
| 2009/0285535 A1 | 11/2009 | van Geffen et al. |

FOREIGN PATENT DOCUMENTS

| | | |
|---|---|---|
| DE | 3546082 A1 | 5/1987 |
| EP | 2056142 A1 | 5/2009 |
| EP | 2141526 A1 | 1/2010 |
| GB | 2419680 A | 5/2006 |
| WO | WO 98/14813 A1 | 4/1998 |

OTHER PUBLICATIONS

Chinese counterpart (201280046035.8) Office Action and Search Report dated Mar. 18, 2015.

Communication with Supplementary European Search Report in European application 12833885.2 (counterpart of 13/623,479) dated Jun. 2, 2015.

* cited by examiner

OPTICAL INTERFACE FOR BIDIRECTIONAL COMMUNICATIONS

CROSS REFERENCE TO RELATED APPLICATIONS

This application claims priority to U.S. Provisional Application No. 61/538,241 filed Sep. 23, 2011, the entire disclosure of which is hereby incorporated herein by reference. This application is also related to concurrently filed U.S. application Ser. No. 13/623,505 entitled "Multi-Channel Transceiver", incorporated herein by reference.

FIELD OF INVENTION

The subject matter herein relates generally to optical interfaces, and more particularly, to an optical interface configuration that facilitates bidirectional communications.

BACKGROUND OF INVENTION

Fiber optic components are used in a wide variety of applications. The use of optical fibers as a medium for transmission of digital data (including voice, internet and IP video data) is becoming increasingly more common due to the high reliability and large bandwidth available with optical transmission systems. Fundamental to these systems are optical subassemblies for transmitting, receiving, and/or manipulating optical signals.

Optical subassemblies typically comprise an optical interface. As used herein, the optical interface functions as an optical link between one or more optical conduits (such as optical fibers) and one or more optical components (such as opto-electric devices (OEDs)). There is a general need to simplify both the design and manufacture of optical interfaces. Specifically, there is a need for a simple and robust configuration that reduces the number of optical alignments required in bidirectional communications. The present invention fulfills this need among others

SUMMARY OF INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention provides a simple and robust optical interface that uses a simple and readily manufactured wavelength filter element to facilitate parallel transmit and receive paths and bidirectional communication over an optical conduit. Specifically, the present invention uses a rectilinear wavelength filter element configured to define at least two parallel optical paths, a transmitting optical path and a receiving optical path, and to couple these optical paths to a common optical conduit. The optical axes of the transmitter, receiver and optical conduit are essentially parallel. Because the optical axes are essentially parallel, the axial and radial alignment of the wavelength filter element is not critical, thereby significantly reducing the alignment steps required. Additionally, the parallel transmitting and receiving paths facilitates the positioning of the optical interface and the transmitting and receiving optical components on a common substrate, which simplifies significantly the fabrication process.

Accordingly, one aspect of the invention is an optical interface comprising a simple wavelength filter element configured to facilitate parallel transmit and receive paths and bidirectional communication over an optical conduit. In one embodiment, the optical interface comprises: (a) a first portion having at least one optical conduit interface with a first axis for optically coupling with at least one optical conduit; (b) a second portion having at least one transmitter interface with a second axis for optically coupling with a transmitting optical device, and at least one receiver interface with a third axis for optical coupling with a receiving optical device, the first, second and third axes being essentially parallel; and (c) a wavelength filter element (WFE) disposed between the first and second portions, the WFE defining a first optical path between the transmitter interface and the optical conduit interface, and a second optical path between the optical conduit interface and the receiver interface.

Another aspect of the invention is an optical assembly using the optical interface described above. In one embodiment, the optical assembly comprises: (a) an optical interface comprising at least: (i) a first portion having at least one optical conduit interface with a first axis for optically coupling with at least one optical conduit; (ii) a second portion having at least one transmitter interface with a second axis for optically coupling with a transmitting optical device, and at least one receiver interface with a third axis for optical coupling with a receiving optical device, the first, second and third axes being essentially parallel; and (iii) a wavelength filter element (WFE) disposed between the first and second portions, the WFE defining a first optical path between the transmitter interface and the optical conduit interface, and a second optical path between the optical conduit interface and the receiver interface; (b) a substrate defining a planar surface essentially perpendicular to the first, second and third axes, the optical interface being disposed on the planar surface; (c) at least one transmitting optical device optically coupled with the transmitter interface; (d) at least one receiving optical device optically coupled with the receiver interface; (e) a transmitter driver mounted on the substrate, adjacent the transmitting optical device; (f) a receiver driver mounted on the substrate, adjacent the receiving optical device; (g) at least one circuit board comprising transmitter circuitry and receiver circuitry, the circuit board being essentially parallel to the axes; and (h) at least one flexible circuit electrically connecting the transmitter driver to the transmitter circuitry, and connecting the receiver driver to the receiver circuitry.

Yet another aspect of the invention is transceiver comprising the optical assembly described above. In one embodiment, the transceiver comprises: (a) an optical interface comprising at least: (i) a first portion having at least one optical conduit interface with a first axis for optically coupling with at least one optical conduit; (ii) a second portion having at least one transmitter interface with a second axis for optically coupling with a transmitting optical device, and at least one receiver interface with a third axis for optical coupling with a receiving optical device, the first, second and third axes being essentially parallel; and (iii) a wavelength filter element (WFE) disposed between the first and second portions, the WFE defining a first optical path between the transmitter interface and the optical conduit interface, and a second optical path between the optical conduit interface and the receiver interface; (b) a substrate defining a planar surface essentially perpendicular to the first, second and third axes, the optical interface being disposed on the planar surface; (c) at least one transmitting optical device optically coupled with the transmitter interface; (d) at least one receiving optical device optically coupled with the receiver interface; (e) a transmitter driver mounted on the substrate, adjacent the transmitting optical device; (f) a receiver driver mounted on the substrate, adjacent the receiving optical device; (g) at least one circuit board comprising transmitter circuitry and receiver circuitry, the circuit board being essentially parallel to the axes; (h) at least one flexible circuit electrically connecting the transmitter driver to the transmitter circuitry, and connecting the receiver driver to the receiver circuitry; (i) a housing containing the optical assembly; and (j) an adapter adjacent the optical interface to receive an optical connector

DETAILED DESCRIPTION

Figure 1A:
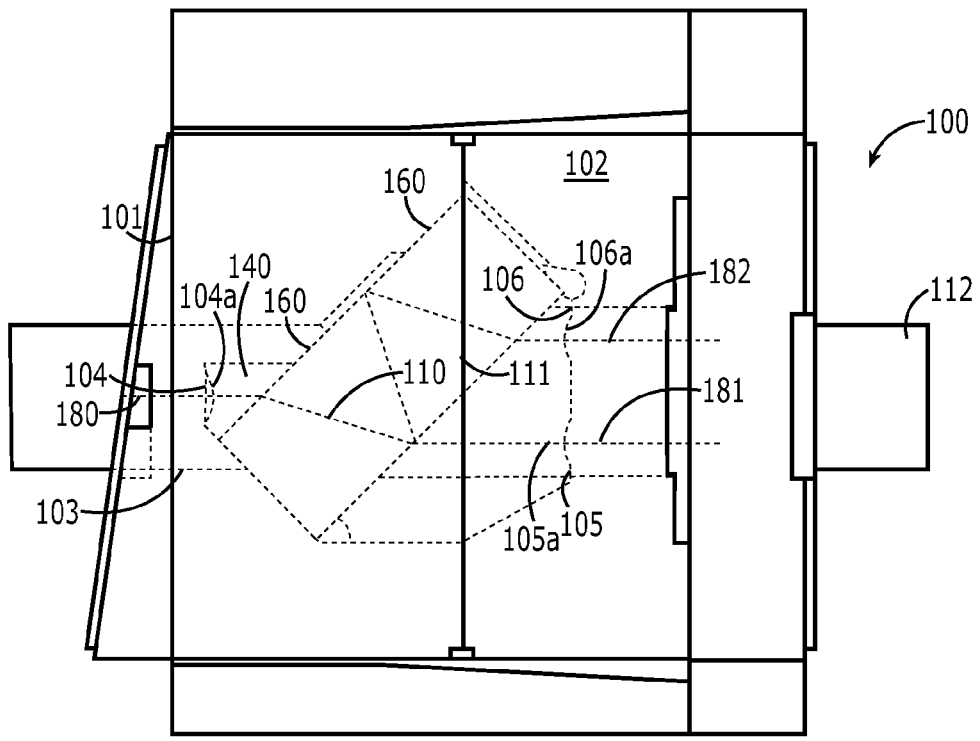
FIGS. 1a and 1b show one embodiment of an optical interface of the present invention.
Figure 1B:
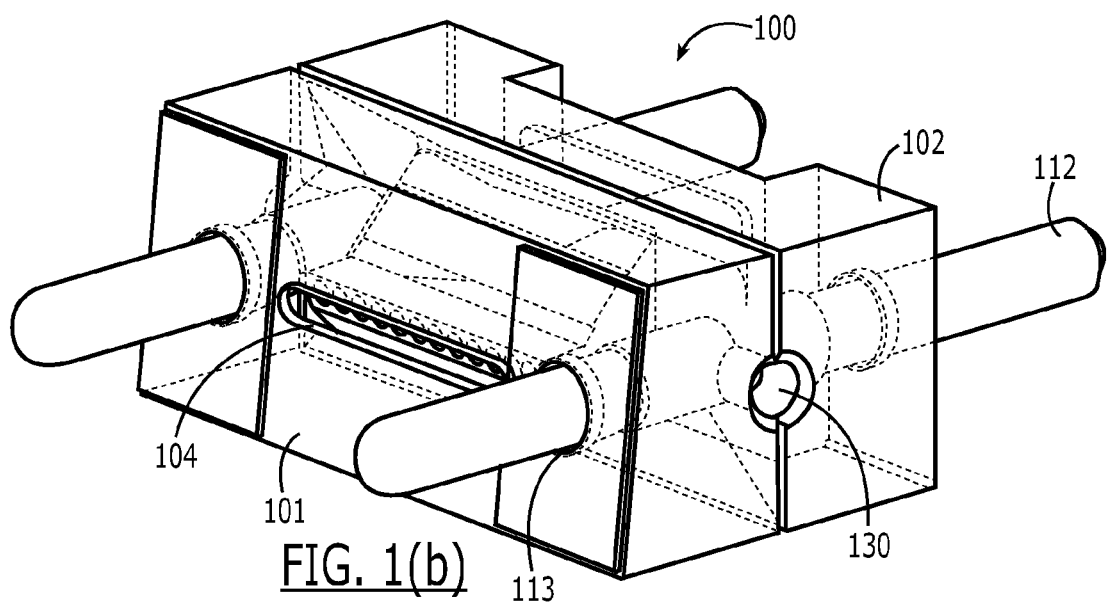
Figure 2:
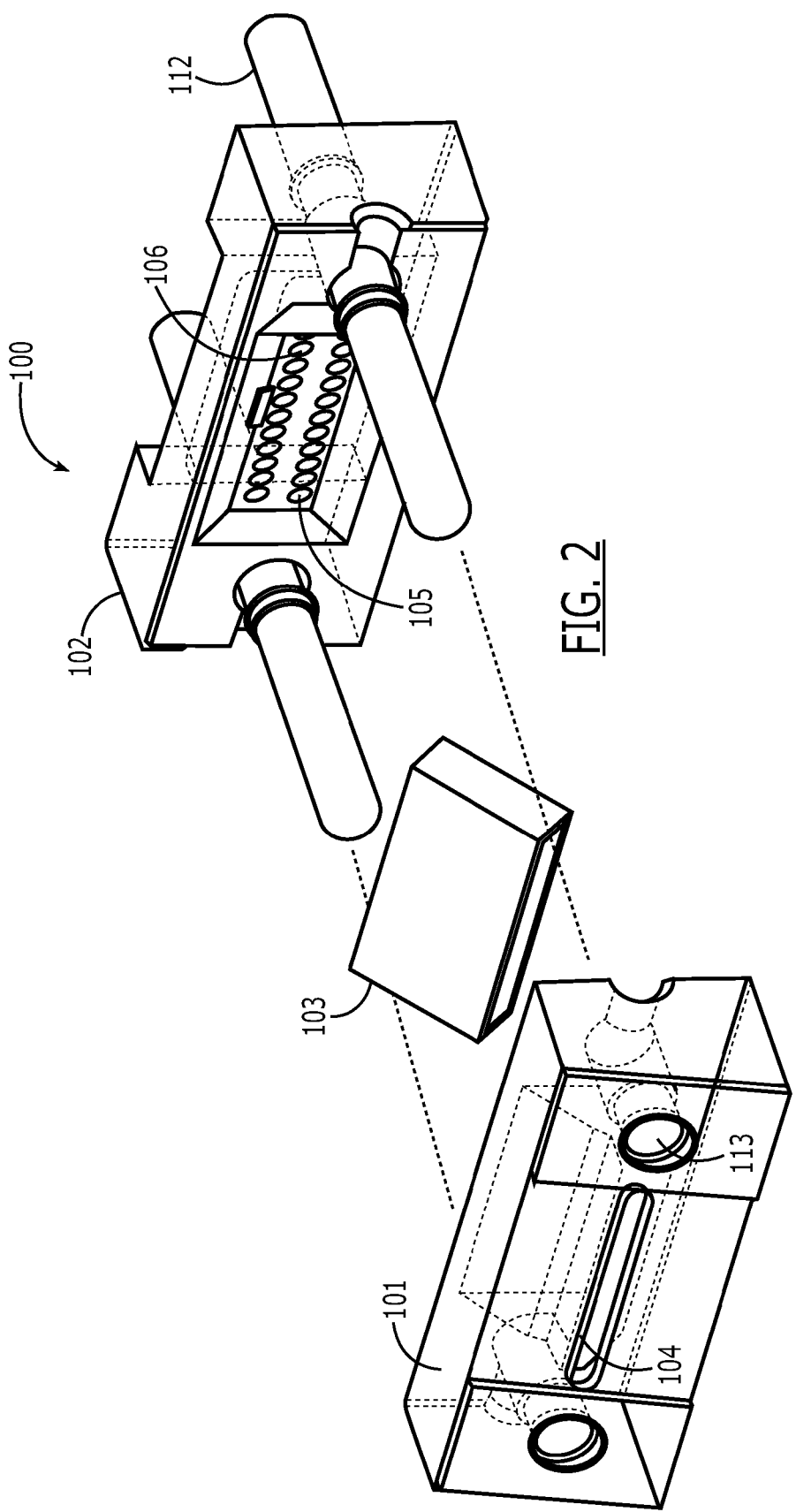
FIG. 2 shows an exploded view of the optical interface of FIG. 1.

Referring to FIGS. 1(a), 1(b) and 2, one embodiment of the optical interface 100 of the present invention is shown. As used herein, an optical interface refers to the interface between an optical conductor and one or more optical devices, which are typically, although not necessarily, optoelectric devices (OEDs).

The optical interface 100 comprises a first portion 101 having at least one optical conduit interface 104 with a first axis 180 for optically coupling with at least one optical conduit (not shown). The optical interface 100 also comprises a second portion 102 having at least one transmitter interface 105 with a second axis 181 for optically coupling with a transmitting optical device (not shown), and at least one receiver interface 106 with a third axis 182 for optically coupling with a receiving optical device (not shown). The first, second and third axes are essentially parallel. Disposed between the first and second portions 101, 102 is a wavelength filter element (WFE) 103. The WFE 103 defines a first optical path 110 between the transmitter interface 105 and the optical conduit interface 104, and a second optical path 111 between the optical conduit interface 104 and the receiver interface 106. Each of these elements is described in greater detail below.

The first and second portions function to optically interface with the optical conduit and with the transmitting and receiving optical devices. Typically, although not necessarily, the optical conduit is an optical fiber or wave guide secured in a mating connector, which interengages with the optical interface 100 or with a structure containing the optical interface (see, e.g., a transceiver 900 (see FIG. 9)). The optical device may be any device that receives or transmits light and may include, for example: (a) an optoelectric device (OED), which is an electrical device that sources, detects and/or controls light (e.g. photonics processor, such as, a CMOS photonic processor, for sending/receiving optical signals, processing the signals and transmitting responsive signals, electro-optical memory, electro-optical random-access memory (EO-RAM) or electro-optical dynamic random-access memory (EO-DRAM), and electro-optical logic chips for managing optical memory (EO-logic chips), lasers, such as vertical cavity surface emitting laser (VCSEL), double channel, planar buried heterostructure (DC-PBH), buried crescent (BC), distributed feedback (DFB), distributed bragg reflector (DBR); light-emitting diodes (LEDs), such as surface emitting LED (SLED), edge emitting LED (ELED), super luminescent diode (SLD); and photodiodes, such as P Intrinsic N (PIN) and avalanche photodiode (APD)); (b) a passive component, which does not convert optical energy to another form and which does not change state (e.g., fiber, lens, add/drop filters, arrayed waveguide gratings (AWGs), GRIN lens, splitters/couplers, planar waveguides, or attenuators); or (c) a hybrid device which does not convert optical energy to another form but which changes state in response to a control signal (e.g., switches, routers, modulators, attenuators, and tunable filters). It should also be understood that the optical device may be a single discrete device or it may be assembled or integrated as an array of devices.

The first component 101 comprises the optical conduit interface 104. The optical interface 104 may comprise any known device for collimating or focusing optical light to and from the optical conduit (not shown). A collimator is a device that narrows a beam of particles or waves. To "narrow" can mean either to cause the directions of motion to become more aligned in a specific direction (i.e., collimated or parallel) or to cause the spatial cross section of the beam to become smaller. Generally, although not necessarily, the optical conduit interface 104 comprises a lens 104a defined with respect to the interface of the optically transparent material of the first component 101 and the air in the cavity 140 defined between the first and second portions 101, 102 as shown in FIG. 1(a). Likewise, the transmitter interface 105 and receiver interface 106 are also configured with lenses 105a, 106a, respectively, to collimate the light being transmitted from the transmitting optical device (not shown) or focusing the light entering the receiving optical device (not shown). Again, the configuration of these interfaces may vary, although generally, but not necessarily, the configuration involves a lens defined between the optically-transparent material of the second portion 102 and the air in the cavity 140 as shown.

In one embodiment, the optical conduit, receiver and transmitter interfaces are integrally molded with the first and second portions as shown in FIGS. 1(a), 1(b) and 2. Alternatively, the first and second portions 101, 102 may be molded with cavities (or other type of receptacle) in the location of their respective interfaces such that discrete collimators may be disposed in the cavities. Still other embodiments of interfaces will be know to those of skill in the art in light of this disclosure.

Figure 12A:
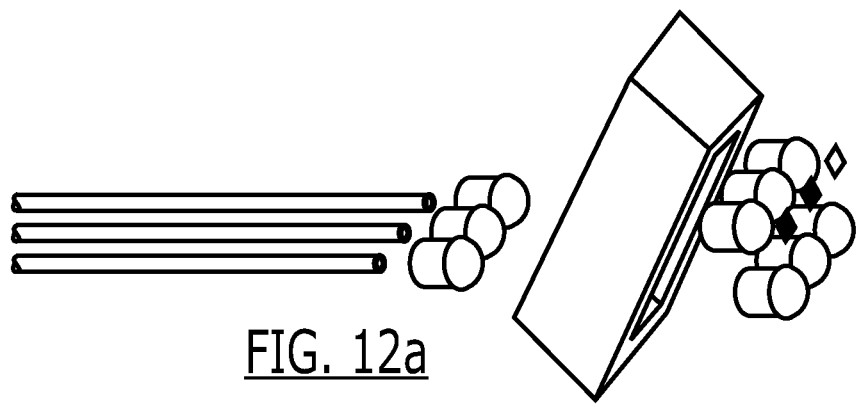
FIGS. 12a and 12b show schematics of the first and second optical paths for multiple transmit and receive optical devices.
Figure 12B:
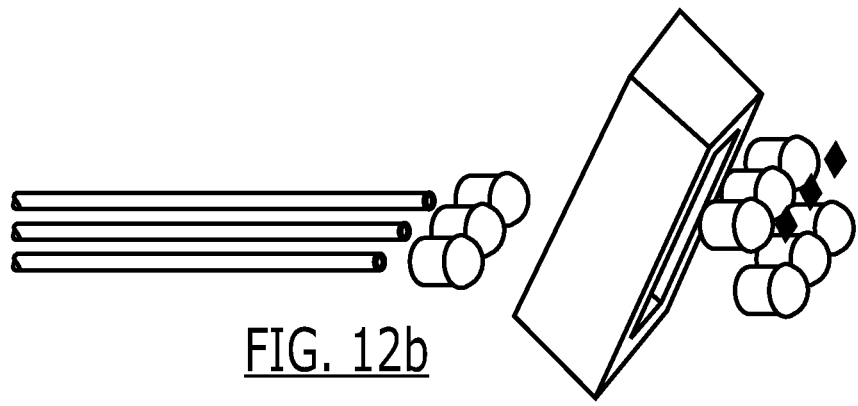

In one embodiment, the optical interface 100 is configured to accommodate a plurality of optical conduits. For example, referring to FIG. 1(b) and FIG. 2, the first portion 101 comprises a plurality of optical conduit interfaces 104. It should be understood that such embodiments, the WFE 103 defines a first optical path between each optical conduit interface and each transmitter interface and a second optical path between each optical conduit interface and each receiver interface. Thus, in such an embodiment, the WFE 103 defines a plurality of parallel (i.e., side by side) first optical paths as shown schematically in FIG. 12b, and a plurality of parallel (i.e., side by side) second optical paths as shown schematically in FIG. 12a.

The number of transmitter interfaces 105 and receiver interfaces 106 defined in the second portion 102 will correspond with the number of optical conduit interfaces 104 in the first portion 101. In this embodiment, one transmitter interface and one receiver interface correspond to a given optical conduit interface. It should be understood, however, that the optical interface of the present invention is not limited to just one transmit signal and one receive signal on a given channel. For example, the WFE may be configured to multiplex/demultiplex on a given channel two or more receive signals of different wavelengths and two or more transmit signals of different wavelengths. In such an embodiment, the area of the WFE 103 is extended to facilitate additional optical paths, and additional rows of transmitter/receiver interfaces are defined in the second portion.

In this particular embodiment, the first portion 101 defines twelve (12) different optical conduit interfaces 104. At this time, twelve conduit optical cables are common in certain MT-type ferrules including the MPO and MPX type connector systems. Although a twelve-channel system is disclosed in particular herein, it should be understood, that the invention is not limited to a twelve conductor cable, and can be used with any number of optical conduits.

The first and second portions are shown in FIGS. 1 and 2 as being discrete components. Such an embodiment offers a number of benefits. For example, such a configuration provides easy access to the interfaces defined on each portion, which facilitates precision molding of their respective lenses. Additionally, by splitting the interfaces among discrete components, the yield loss due to interface molding rejection is not compounded. In other words, if a certain amount of product must be scrapped in the molding process due to the defects in the interface molding, splitting the interfaces among different portions will limit the waste in the event that one interface does not pass inspection. Still another advantage of discrete components is the ease by which the WFE may be inserted between them as discussed below. Still other advantages of having discrete components will be obvious to those of skill in the art in light of this disclosure. However, it should understood that the invention is not limited to an embodiment in which the first and second portions 101 and 102 are discrete, and, alternatively, the first and second portions may be integrally formed. Integrally forming the first and second portions offers certain benefits including inherent alignment between the optical conduct interfaces and the transmitter/receiver interfaces without the need to aligning the first and second portions using alignment pins/alignment pin holes as described below.

As mentioned above, the first and second portions must comprise a material which is optically transparent at the anticipated wavelengths of the transmit and receive signals. In this respect, generally, the material should be transparent for wavelengths of 1310 nm to 1490 nm. Suitable materials includes, for example, polycarbonate, polyether-imide or polyarylsulfone. Such materials are commercially available from, for example, General Electric as UTEM™

The first and second portions may be molded using any well known technique, including, but not limited to, injection molding, compression molding or transfer molding. In one embodiment, injection molding is used.

The first and second portions 101, 102 also function to hold the WFE 103 at a precise angle with respect to the first, second and third axes. Generally, because the first, second and third axes are parallel, the WFE can be moved axially and radially without significant effect on the optical paths. However, the WFE is very sensitive to angular misalignment with respect to the axes. Just a slight angular misalignment may result in the first and second optical paths not coupling with the interfaces of the first and second portions. Accordingly, the first and second portions should be configured to precisely hold the WFE in angular alignment with the axes. To this end, in the embodiment shown in FIG. 1, the first portion 101 defines one or more register surface 160 which are configured to contact the WFE 103 and ensure its proper angular alignment with respect to the various axes. It should be understood, that other means of aligning the WFE 103 between the first and second portions 101, 102 will be known to those of skill in the art in light of this disclosure.

Figure 3:
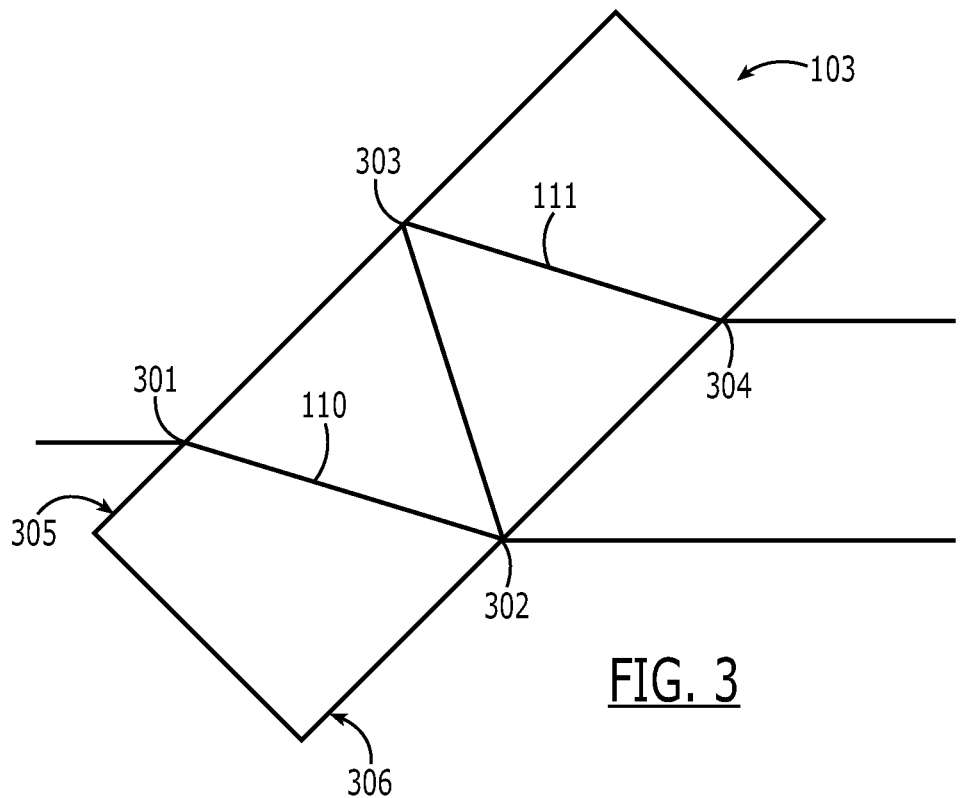
FIG. 3 shows one embodiment of the wavelength filter of the present invention.

To ensure proper alignment between the first and second portions 101, 102, various mechanical alignment means may be used. Examples of alignment mechanisms include keys on the first and second portions that mechanically interengage with one another, an external sleeve or other structure that holds the portions together, or alignment pins and alignment pin holes on the first and second portions that interengage. In the embodiment of FIGS. 1 through 3, alignment pins 112 are used to align the first and second portions 101, 102. Furthermore, in one embodiment, the alignment pins are also used to align the optical interface 100 to the substrate 601 of an optical assembly 600 as described below with respect to FIGS. 6-8. The use of alignment pins is well known in the art and is used, for example, in MT-type connectors.

Figure 5:
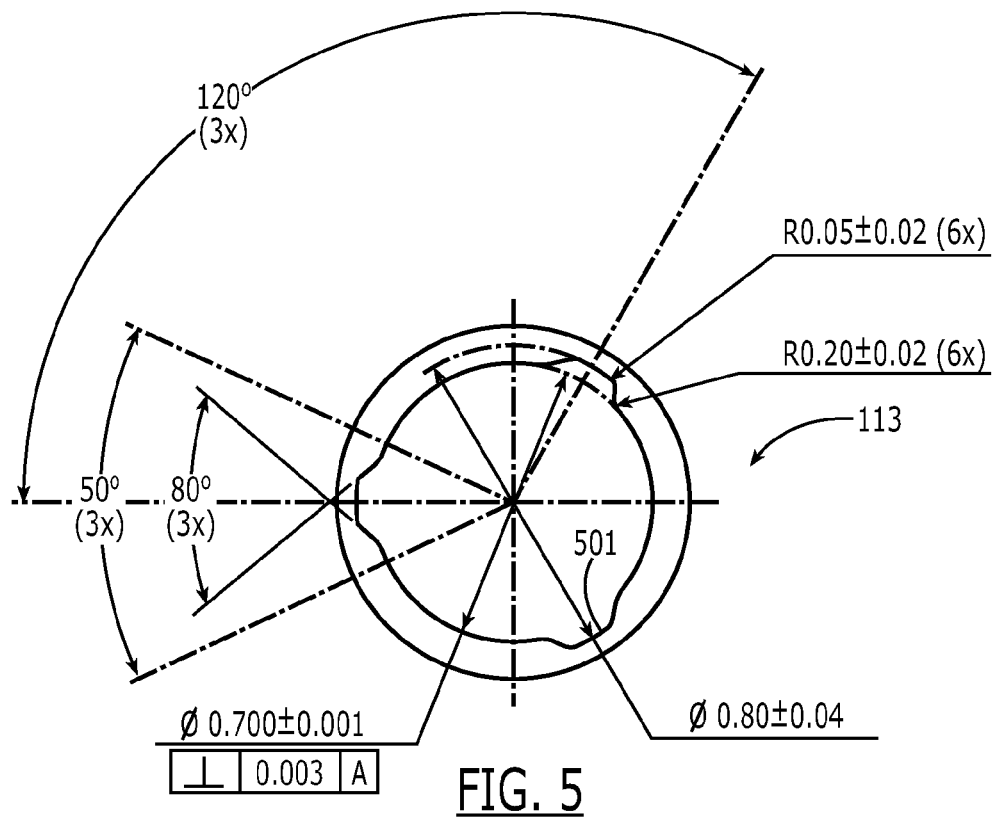
FIG. 5 shows one embodiment of the alignment pin holes in the optical interface of FIG. 1.

In one embodiment, the first and second portions are secured to the alignment pins using adhesive. To this end, in one embodiment, the optical interface comprises an alignment pin hole 113 having capillary channels 501 as shown in FIG. 5. It has been found that the capillary channels 501 facilitate the even distribution of adhesive along the length of the alignment pin holes 113 in the first and second portions 101, 102. Furthermore, in one embodiment, an orifice 130 (see FIG. 1(b)) is defined in the side of the optical interface to facilitate the introduction of the adhesive in the alignment pin hole 113. Introducing the adhesive between the first and second portions 101, 102 is preferable as it avoids the need for the adhesive to flow down the entire length of the alignment pin hole of one portion before reaching the alignment pin hole of the other portion. Still other means of introducing adhesive in the optical interface of the present invention will be obvious to those of skill in the art in light of this disclosure.

The adhesive used to secure the first and second portions to the alignment pins can be any known adhesive for securing plastic or glass to metal. In one embodiment, the adhesive is a heat curable adhesive such as an epoxy. In one embodiment, the heat curable epoxy is cured by transmitting low level current through the alignment pins 112. Applicants have discovered that the high resistance associated with the metal typically used in such pins (e.g., stainless steel) causes the temperature of the pin to rise significantly thus curing the adhesive. Such an approach is beneficial over attempting to heat the entire optical interface 100, as the first and second portions typically comprise a thermal-insulating material such as a plastic. Thus, attempting to heat the optical interface as a whole to cure the adhesive in the alignment pin holes is frustrated by the thermal-insulating characteristics of the first and second portions. Conversely, when passing current through the pins, the thermal-insulating properties of the first and second portions facilitate curing as their insulating properties tend to prevent heat from dissipating from the alignment pins 112.

The WFE 103 functions to couple light between the optical conduit and either the receiver interface or the transmitter interface. To this end, the WFE filters the wavelengths of the receive and transmit signals to ensure that only the receive signal is coupled from the optical conduit interface to the receiver interface and only the transmit signal is coupled from the transmitter interface to the optical conduit interface. Referring to FIG. 3, a schematic of the WFE 103 is shown with the first and second light paths 110, 111 illustrated, in which the transmit and receiver signals are selectively transmitted, refracted and reflected between the first and second parallel surfaces 305, 306.

Considering the first light path 110, the transmit signal is launched from a transmitter component (not shown) to the right of the WFE 103 as pictured in FIG. 3, and is incident upon point 302 on the second parallel surface 306. At this point, differences in the refractive index of air and the material of WFE 103 causes the light to bend slightly as it propagates through the WFE to first parallel surface 305. The transmit signal is incident upon the first parallel wall 305 at point 301. At this point, the transmit signal leaves the WFE 103 at a slight angle due to refractive differences between the WFE and air, and is coupled to the optical conduit interface (not shown) to the left of the WFE 103 as pictured in FIG. 3. Regarding the second light path 111, the receive signal is launched from the optical conduit (not shown) to the left of the WFE 103 as pictured in FIG. 3, and is incident upon point 301 on the first parallel surface 305. At this point, differences in the refractive index of air and the material of WFE 103 causes the light to bend slightly as it propagates through the WFE to second parallel surface 306. The receive signal is incident upon the second parallel wall 306 at point 302. At this point, the signal is reflected back to the first parallel surface 305. The receive signal is incident upon the first parallel surface 305 at point 303 at which point the signal is again reflected to point 304 on the second parallel surface 306. At this point, the receive signal leaves the WFE 103 at a slight angle due to refractive differences between the WFE and air, and is coupled to the receiver interface (not shown) to the right of the WFE 103 as pictured in FIG. 3.

From this description, it should be obvious that the first optical path 110 is essentially a direct path from the transmitter interface through the optical WFE and to the optical conduit interface. There is no reflection of the signal within the WFE 103. Conversely, second optical path 111 is a more complex and longer path in which the light is reflected at points 302 and 303 on its way to the receiver interface. Although the first and second paths may be switched for the transmitter and receiver interfaces, it is generally preferable to couple the receiver interface to the longer optical path because the receiving optical device is generally more tolerant of receiving light. For example, the mold field diameter is much larger for a photo diode (about 70 µm) than for an optical fiber or transmitting optical device (about 9 µm). Therefore, it is generally easier to couple light to a receiving optical device than it is to couple light to an optical fiber or a transmitting optical device. Accordingly, because light dispersion and variation is more likely along the longer optical path 111, it is preferred (although not necessary) that the longer path be coupled to the receiver.

Figure 4:
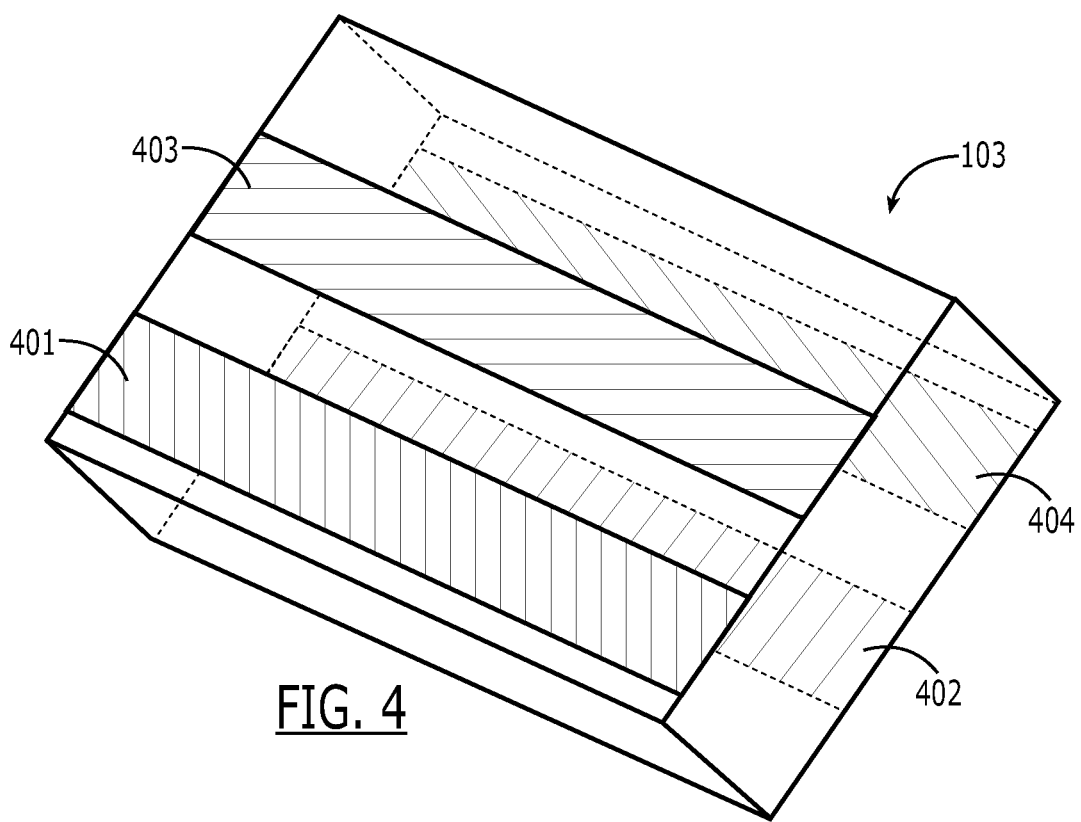
FIG. 4 is a schematic showing various coatings on the wavelength filter element shown in FIG. 3.

Referring to FIG. 4, a schematic of one embodiment of the WFE 103 is shown with coatings to enhance its optical performance and wavelength selectivity. Specifically, certain coatings are used to enhance reflection of certain wavelengths, while ensuring that other wavelengths are not reflected. Specifically, coating 401 corresponds to the area around point 301 as described with respect to FIG. 3. This is the point at which a receive signal enters the WFE 103 and the transmit signal exits the WFE 103. Accordingly, in one embodiment, coating 401 is an anti-reflective coating for the wavelengths of both the transmit and receive signals (e.g., transmit 1480-1500 nm and receive 1260-1360 nm). Coating 402 corresponds to point 302 with respect to FIG. 3. This is the point at which a transmit signal enters the WFE 103 and the receive signal is reflected to point 303. Accordingly, in one embodiment, coating 402 is transparent for the transmit signal wavelength, but is reflective for the receive signal wavelength. Coating 403 corresponds to point 303 in the schematic of FIG. 3. This point corresponds to the receive signal being reflect to point 304 as described above. At this point, there is no overlap with the transmitting signal so coating 403 can be a mirror coating suitable for reflecting all wavelengths. Coating 404 corresponds to point 304 which is the point at which the receive signal exits the WFE 303 and couples to the receiver interface as described with respect to FIG. 3. Accordingly, in one embodiment, coating 404 is an anti-reflective coating for the received signal wavelength. Furthermore, to reduce crosstalk between the transmitter and receiver interfaces, in one embodiment, coating 304 is also reflective for all other frequencies but the receive signal wavelength to ensure that only the receive signal wavelength is transmitted or coupled to the receiver interface.

The WFE 103 may be discrete or it may be integrally molded with the first and second portions 101, 102. Generally, it is preferable for the WFE 103 to be discrete from the first and second portions to improve manufacturability. Specifically, in one embodiment, the WFE 103 has a simple rectilinear form with various coatings as described above. Such a device can be prepared economically in bulk, as a sheet or wafer, and then diced into individual components.

The optical interface 100 lends itself to robust packaging with a high degree of manufacturability. One embodiment of the packing is an optical assembly 600 shown in FIGS. 6 and 7. The optical assembly 600 comprises an optical interface 100 as described above mounted to a substrate 601. The substrate defines a planar surface 601a essentially perpendicular to the first, second and third axes. Also mounted to the planar surface 601a is at least one chip 701 comprising at least one transmitting optical device 801 and at least one receiving optical device 802 (see FIG. 8), each transmitting optical device and receiving optical device is optically coupled with a corresponding transmitter interface 105 and receiver interface 106, respectively (see FIG. 10a). Mounted to the planar surface 601a, adjacent the transmitting optical device and receiving optical device, are a transmitter driver 602 and a receiver driver 603, respectively. Essentially perpendicular to the planar surface 601a is at least one circuit board comprising transmitter circuitry and receiver circuitry. The transmitter and receiver drivers are connected to the driver to the receiver circuitry with a flexible circuit 604. These elements are described in greater detail below.

The substrate 601 functions to support the optical interface 100 and the OEDs, and, in one particular embodiment, also functions to align them such that the OEDs optically couple with the optical interface. In one embodiment, the substrate also functions as a heat sink for dissipating the heat generated by the OED.

Figure 7:
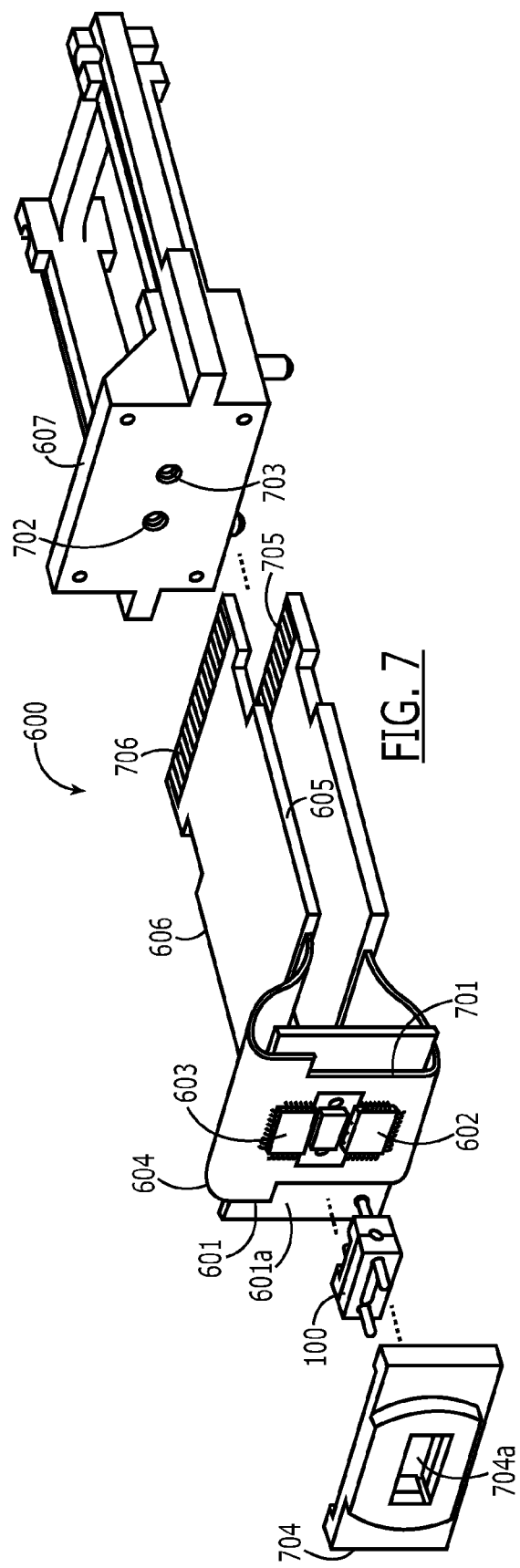
FIG. 7 shows an exploded view of the optical assembly of FIG. 6.

Referring to the embodiment shown in FIG. 7, the substrate 601 comprises a planar surface 601a upon which the optical devices and the optical interface are mounted. In one embodiment, to ensure the proper positioning of the optical interface 100 on the planar surface 601a, alignment pin holes 703 are used to cooperate with the alignment pins 112 discussed above. The use of alignment pins and alignment pin holes for alignment purposes is well known, for example, in MT type connectors. Such alignment techniques very precisely position the optical interface 100 on the planar surface 601a. Although alignment pins are shown in this embodiment, it should be understood that other means of aligning the optical interface 100 relative to the optical devices on the planar surface 601a are possible within the scope of this invention. For example, fiducials may be disposed on the planar surface 601a to facilitate passive alignment. The fiducials may be in the form of, for example, protrusions against which the optical interface 100 abuts, or visual marking for automatic pick and place processing. Still other alignment techniques can be used such as disclosed in U.S. Pat. No. 5,574,561.

As mentioned above, the transmitter and receiving optical devices may be discrete OEDs individually mounted on the planar surface 601a. In one embodiment, the transmitter and receiving optical devices are combined in arrays and mounted on a chip. Arrays of OEDs are generally preferred as the alignment among the OEDs of a given array tends to be highly accurate, thus requiring only the array to be aligned and not the individual OEDs. For example, referring to FIG. 8, in one embodiment, the chip 701 is configured for disposition on the planar surface 601a. The chip 701 comprises a substrate 810, on which is mounted a transmitting optical device array 801, and a receiving optical device array 802. In this particular embodiment, the transmitter and receiver arrays 801, 802 are wire bonded to traces 804, 805 respectively by wire bonds 803.

To facilitate alignment between the OEDs and the optical interface 100, it is important that the arrays 801, 802 are precisely disposed on the substrate 810. There are generally two alignment approaches for aligning OEDs—active and passive. In passive alignment, registration or alignment features are typically fabricated directly on the components as well as on the substrate to which the components are to be mounted. The components are then positioned on the substrate using the alignment features and affixed in place. In active alignment, the OEDs are placed on the substrate, but before being affixed thereto, an optical signal is transmitted through the components while they are manipulated to provide optimum optical performance. Once optimum performance is achieved, the components are affixed to the substrate. Although active alignment tends to be more precise than passive alignment, passive alignment facilitates high-speed, high-volume automated manufacturing and, thus, is preferred. It tends to be exceedingly difficult, however, to optically align in all three axes using passive alignment, especially if exceptionally good alignment is required. Nevertheless, a significant reduction in manufacturing time and costs can be realized if passive alignment can be used to achieve acceptable alignment along two axes or even one so that active alignment is only necessary for the remaining axes or for fine tuning.

The optical interface of the present invention may have a number of features to facilitate passive alignment of the OED. In one embodiment, the substrate has fiducials as mentioned above to facilitate passive alignment of the OED such that each of its optical axes is aligned with its respective reflective interface.

In one embodiment, a pattern of contact pads is used that passively align the OED during a reflow operation. Specifically, the OED is provided with a certain pattern of contact pads on its mounting side, and the substrate has the same pattern of pads on its first planar surface. The OED is then placed on the substrate pads in rough alignment using known pick and place technology. Alignment between the substrate pads and OED pads is then achieved when the assembly is reflowed such that the surface tension of the contact pads causes the patterns of the OED to align over the pattern on the substrate, thereby precisely positioning the OED relative to the reflective surfaces and grooves of the substrate. Such a mechanism is well known and disclosed, for example, in U.S. Pat. No. 7,511,258, incorporated herein by reference.

In another embodiment, rather than or in addition to contact pads, other fiducials on the substrate are used to facilitate passive alignment. For example, the fiducials may be physical structures protruding from the planar surface that provide a register surface against which the edge of the OED may contact to be positioned correctly on the substrate. Alternatively, the fiducials may be markings to enable visual alignment of the OED on the substrate using a commercially-available, ultra-high precision die bonding machine, such as, for example, a Suss MicroTec machine (See, e.g., U.S. Pat. No. 7,511,258).

Additionally, a combination of fiducials and contact pads may be used. For example, the pads may be used to pull the OED into contact with the raised fiducials of the substrate. Still other alignment techniques will be apparent to one of skill in the art in light of this disclosure.

Figure 8:
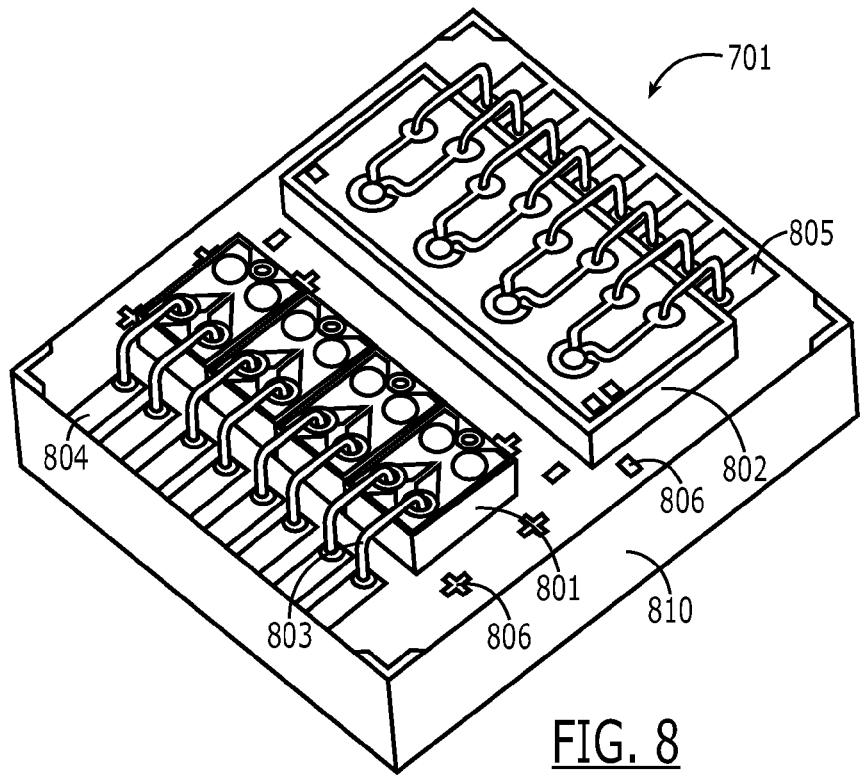
FIG. 8 shows one embodiment of a chip holding arrays of transmitting optical devices and receiving optical devices.

In the embodiment shown in FIG. 8, the substrate 810 comprises a number of fiducials 806 which are defined on the substrate 810. Using known techniques, the arrays 801 and 802 can be precisely positioned on the substrate 810 using the fiducials 806 as described above.

By precisely positioning the arrays 801, 802 on the substrate 810, alignment of the associated OEDs with the optical interface 100 can be achieved by precisely mounting the substrate 810 to the planar surface 601a. To this end, the different alignment techniques described above with respect to positioning the arrays 801, 802 on the substrate 810 can be used to position the substrate 810 on the planar surface 601a. Generally, the use of visual or structural fiducials is preferred over solder patterns since there are no electrical connections between the substrate 801 and the planar surface 601a.

In one embodiment, the combination of the alignment pin holes (not shown) and fiducials (not shown) on the planar surface 601a facilitates the proper alignment of the optical interface 100 to the chip 701. That is, by registering the fiducials for positioning of the chip 701 relative to the alignment pin holes, or vice versa, the relative position of the chip and the optical interface is assured. In one embodiment, the fiducials and the position of the alignment pin holes are defined on the planar surface 601a in a single lithography step.

Figure 6:
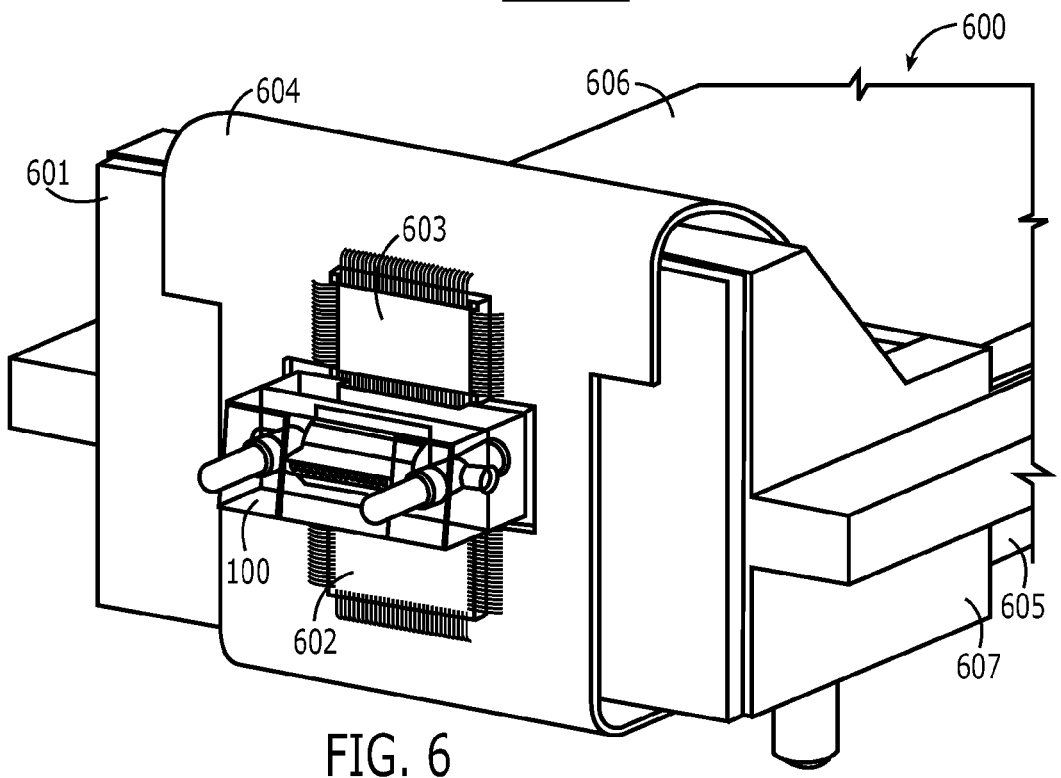
FIG. 6 shows one embodiment of an optical assembly comprising the optical interface of FIG. 1.

As is well known, driver circuitry is required to operate the transmitter and receiving optical devices. As shown in FIGS. 6 and 7, in one embodiment, the transmitter driver circuitry 602 is disposed adjacent the transmitter driver array 801 on chip 701. Specifically, the driver circuit 602 is disposed next to and is electrically connected to the contacts 804 as shown in FIG. 8. Likewise, the driver circuitry 603 is disposed adjacent to and electrically connected to the contacts 805 as shown in FIG. 8. Such a configuration minimizes the distance of the electrical connection between the driver circuitry and the OEDs, which tends to enhance performance. Additionally, in embodiment of FIG. 7, the planar surface 601a facilitates the disposition of the chip 701 and the driver circuits 602, 603 all on a common plane.

In one embodiment, the transmitting optical devices are long-wavelength VCSELs such as those commercially available through Beamexpress/Vertilas. VCSELs may be mounted perpendicular to the optical axis, thereby enabling the VCSELs to be prepared in arrays as opposed to discrete units. In the embodiment of FIG. 8, the VCSELS are diced in arrays of four, and placed on a carrier (e.g., ceramic or SI,GaAs) together with four PIN diodes, with respect to alignment fiducials.

VCSELs are not generally favored for long-wavelength applications because VCSELs at such wavelengths do not lend themselves to flip chip mounting. As used herein, long-wavelength VCSELs refer to VCSEL having an operating wavelength of 1200-1600 nm. Consequently, at this time, to use such wavelength VCSELs, wire bonding techniques must be used as shown in FIG. 8. Although wire bonding is a well known and mature technology, it is generally discouraged for high speed applications. Applicants have realized, however, that, in fiber-to-the-home applications, high speed operation is not as important as reliability and manufacturability. Therefore, even though the VCSELs may need to be wire bonded to the substrate (as shown in FIG. 8) and thus may be limited in operating frequencies, such limitations are outweighed by the benefits that VCSEL arrays afford. As mentioned above, the use of such array configurations provides for convenient surface mounting and eliminates alignment steps, which greatly reduce the yield of optical subcomponents.

The transmitter and receiver circuitry for operating the respective drivers is well known. Likewise, circuit boards for supporting such circuitry are well known. In the embodiment shown in FIG. 7, a two circuit board configuration is used. In this embodiment, the bottom circuit board 605 is dedicated to the transmitter circuitry, while the upper circuit board 606 is dedicated to the receiver circuitry. Although two distinct circuit boards are shown in this embodiment, it stood be understood that other configurations are possible. For example, a single circuit board may be used with both receiving and transmitting circuitry defined thereon. Likewise, a single board may be used in which its top surface comprises receiving circuitry and the bottom surface comprises transmitting circuitry. Still other embodiments will be obvious to one of skill in the art in light of this disclosure.

In the embodiment of FIG. 7, the circuit board 605, 606 comprise card-edge connectors 705, 706, which are configured to plug into a corresponding receptacle on a mother board as is well known in the art.

In this embodiment shown in FIG. 7, the optical assembly 600 also comprises a frame 607 for supporting the substrate 601 and one or more circuit boards 605, 606. Specifically, the frame comprises a front face 702 for receiving the substrate 601 and a rear portion on which one or more circuit boards are mounted. The front face 702 defines alignment pin holes 703 for receiving the alignment pin 112 as described above with respect to optical interface 100. Accordingly, when fully assembled, the alignment pins go through the first and second portions, through the substrate 601 and finally through the front face 702 of frame 607, thereby, providing a rigid and precise mounting of the optical interface.

The frame 702 may comprise various discrete components connected or secured to each other, or, it may comprise an integrally-molded single component. In the embodiment shown in FIG. 7, the frame 702 is an integrally-molded component. However, in this embodiment, the substrate 601 is discrete from the frame 607. Such a configuration has a number of benefits. First, because of the critical alignment of the circuitry and the alignment pin holes on the substrate 601, it is generally preferred, although not necessary, that the substrate 601 be prepared with fiducials and/or other alignment features as described above. Such alignment techniques generally are not suitable for a larger, non-planar structure as the frame 607 as shown in FIG. 7. However, as alignment techniques develop, it may be preferred at some time to integrate the substrate 601 with the frame 607.

In one embodiment, the optical assembly 600 also comprises a cover 704, which, serves to protect the optical interface and the OEDs. Specifically, the cover 704 comprises an orifice 704a which is adapted to receive a forward protecting portion of the optical interface 100. When in place, the cover 704 secures the optical interface 100 and prevents it from moving relative to the planar surface 601. Additionally, depending upon the size of the cover 704, it may also cover the driver circuitry 602, 603 or portions thereof.

Figure 9:
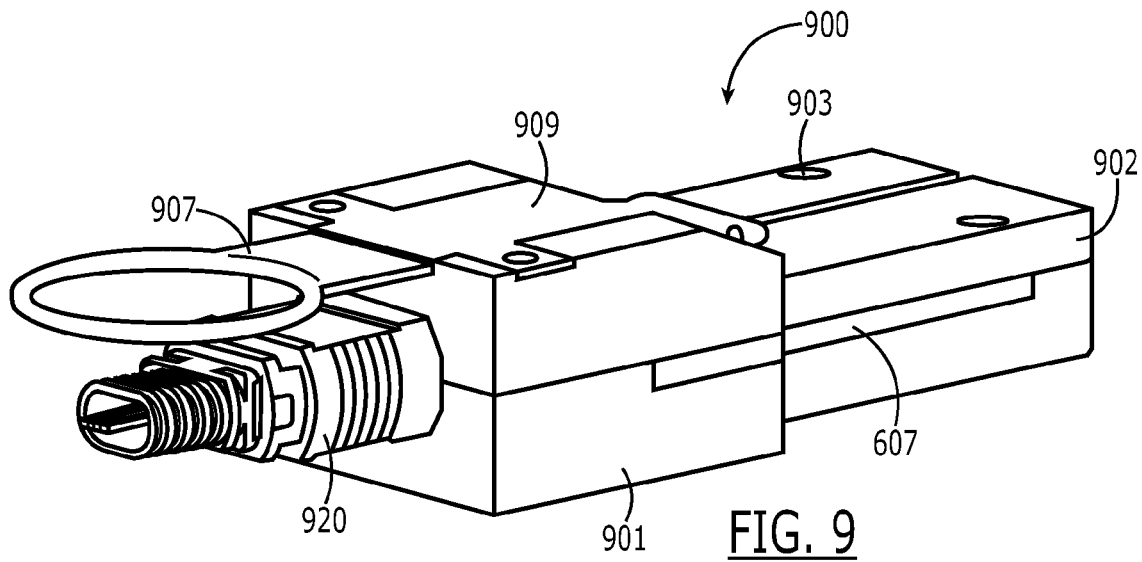
FIG. 9 shows one embodiment a transceiver comprising the optical assembly of FIG. 6.
Figure 10:
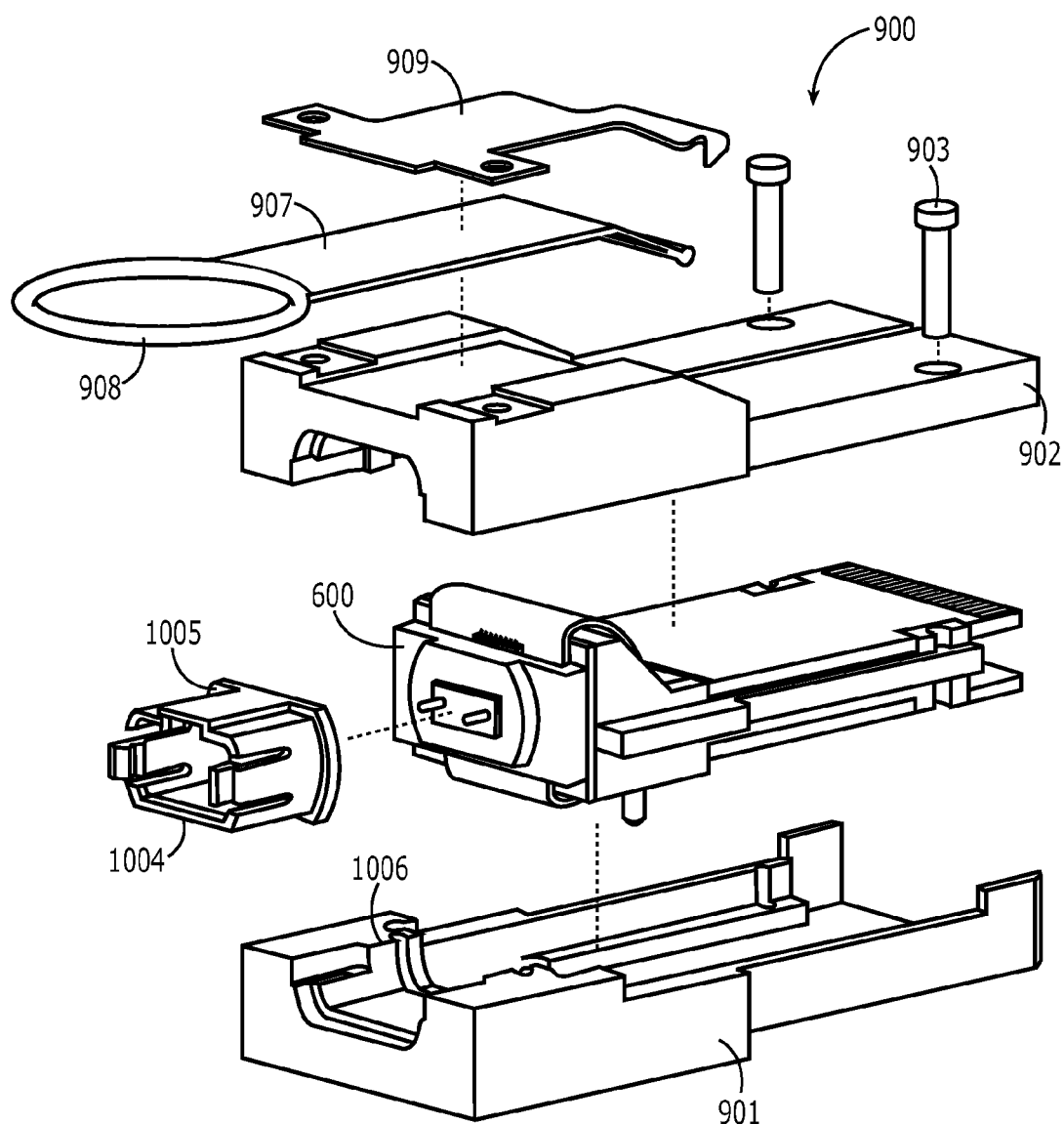
FIG. 10 shows an exploded view of the transceiver of FIG. 9.

Referring to FIGS. 9 and 10, one embodiment of a transceiver 900 of the present invention is shown. Specifically, the transceiver comprises the optical assembly 600 as described above. Enclosing the optical assembly 600 is a housing, which, in this embodiment comprises a lower housing 901 and an upper housing 902. The housings are secured using any known means including, for example, pins 903, which are configured to pass through the upper housing 902, through the optical assembly 600, and into the bottom housing 901, thereby securing the subassembly to the housing while at the same securing both the lower and upper housing 901, 902 together.

In one embodiment, the footprint of the transceiver 900 is based on an electrical CXP interconnect (12 channels upstream of 10 Gb and 12 channels downstream of 10 Gb)

In this embodiment, the transceiver also comprises an adapter 1004 as shown in FIG. 10. Such adapters are well known in the art and are used to receive a mating connector or other known device. As shown in FIG. 9, the adapter 1004 is adapted to receiving a mating connector 920. In one embodiment, the mating connector 920 comprises a ferrule presenting one or more fibers in an array along with alignment pin holes configured to receive the alignment pins 112. Such a connector configuration is well known and is used, for example, in MT-type connectors such as, for example, the MPO, MPX, and MTRJ connectors. In this embodiment, the adapter 1004 is configured with a ridge 1005, which is received in a groove 1006 in both the lower housing 901 and the upper housing 902 (not shown in upper housing). This way, when the adapter 1004 is sandwiched between the lower and upper housings 901, 902, it is held securely in place.

Figure 11:
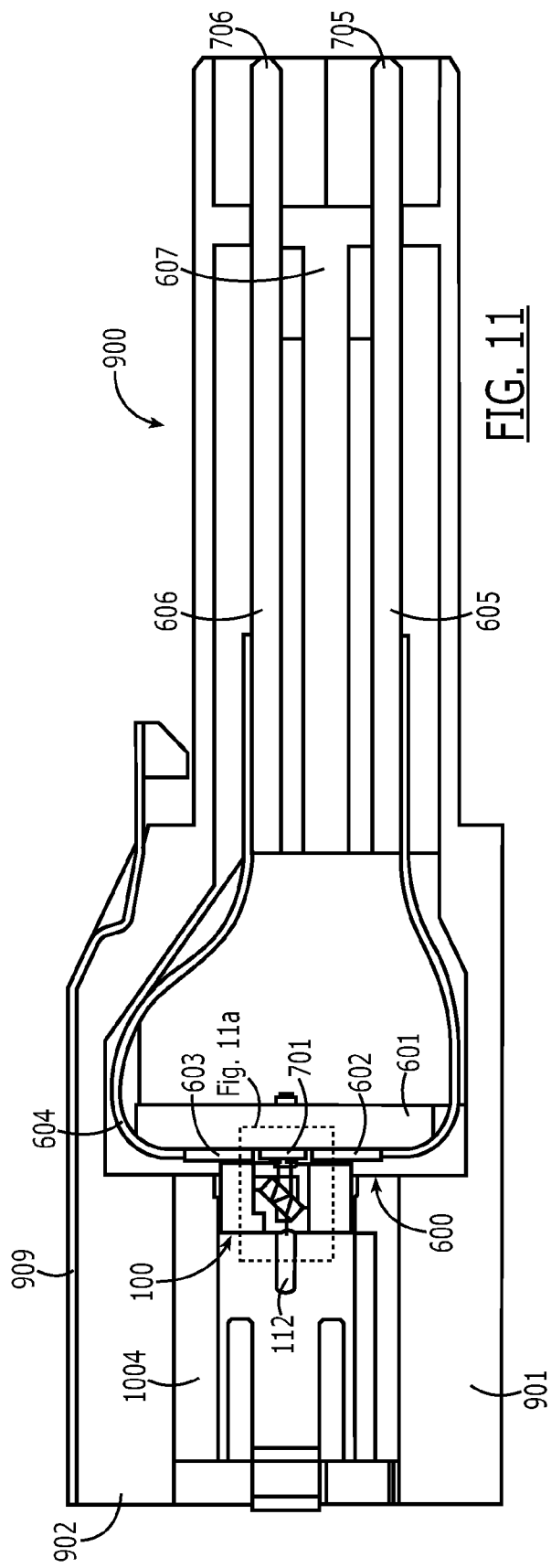
FIG. 11 shows a cross section of the transceiver of FIG. 9.
Figure 11A:
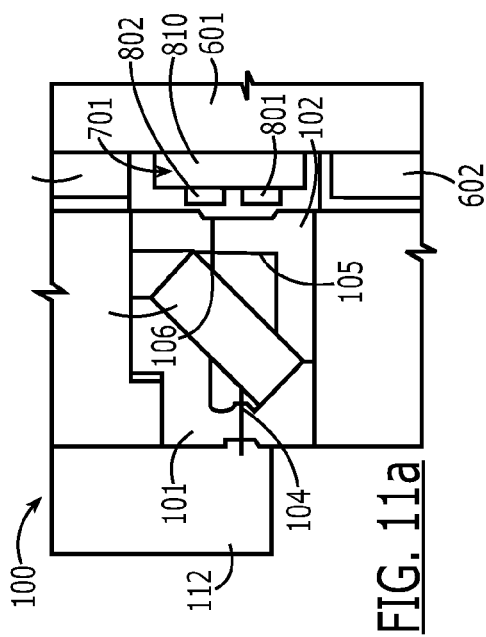
FIG. 11a shows a close up of the optoelectric interface of the transceiver of FIG. 11.

In the embodiment shown in FIG. 9-11, the transceiver 900 also comprises a conductive portion 909, which, in this particular embodiment, is disposed on the upper portion of the transceiver 900. Conductive portions, such as portion 909, are configured to form a grounding path to avoid electrostatic discharge when the transceiver is plugged into a receptacle (not shown).

To facilitate removal of the transceiver from a receptacle, a handle 908 is provided. The handle 908 provides a means for a user to grasp the transceiver 900 and to withdraw it from a receptacle. Such handles are well known in the art.

Referring to FIG. 11, a cross section of the transceiver 900 is shown. FIG. 10a is a close up view of the optical interface 100 and its interface with the OEDs on the substrate 601.

While this description is made with reference to exemplary embodiments, it will be understood by those skilled in the art that various changes may be made and equivalents may be substituted for elements thereof without departing from the scope. In addition, many modifications may be made to adapt a particular situation or material to the teachings hereof without departing from the essential scope. Also, in the drawings and the description, there have been disclosed exemplary embodiments and, although specific terms may have been employed, they are unless otherwise stated used in a generic and descriptive sense only and not for purposes of limitation, the scope of the claims therefore not being so limited. Moreover, one skilled in the art will appreciate that certain steps of the methods discussed herein may be sequenced in alternative order or steps may be combined. Therefore, it is intended that the appended claims not be limited to the particular embodiment disclosed herein.

What is claimed is:

1. An optical interface comprising:
    a first portion having at least one optical conduit interface with a first axis for optically coupling with at least one optical conduit;
    a second portion having at least one transmitter interface with a second axis for optically coupling with a transmitting optical device, and at least one receiver interface with a third axis for optical coupling with a receiving optical device, said first, second and third axes being essentially parallel; and
    a wavelength filter element (WFE), said WFE being a single component discrete from first and second portions, said WFE being held in place by said first and second portions, said WFE defining a first optical path between said transmitter interface and said optical conduit interface, and a second optical path between said optical conduit interface and said receiver interface.

2. The optical interface of claim 1, wherein said first and second portions are discrete components.

3. The optical interface of claim 1, wherein said first and second portions are molded.

4. The optical interface of claim 1, wherein each of said optical conduit interface, transmitter interface and said receiver interface are collimators.

5. The optical interface of claim 4, wherein said collimators are integrally molded with the first and second portions.

6. The optical interface of claim 1, wherein said first portion comprises a plurality of optical conduit interfaces, and said second portion comprises a plurality of transmitter interfaces and a plurality of receiver interfaces.

7. The optical interface of claim 1, further comprising a transmitting optical component optically coupled to said transmitter interface.

8. The optical interface of claim 7, wherein said transmitting optical component is an array of transmitters.

9. The optical interface of claim 8, wherein said array of transmitters is an array of long-wavelength VCSELs.

10. The optical interface of claim 1, further comprising alignment pin holes in said first and second portions, and an alignment pin disposed in said holes, thereby aligning said first and second portions.

11. The optical interface of claim 1, wherein said first optical path is direct from said transmitter interface to said optical conduit interface.

12. The optical interface of claim 11, wherein said second optical path involves at least one reflective surface between said optical conduit interface and said receiver interface.

13. The optical interface of claim 12, wherein said first optical path involves two reflective surfaces.

14. The optical interface of claim 1, wherein said WFE is rectilinear.

15. The optical interface of claim 14, wherein WFE has parallel sides, said parallel sides being held at a certain angle with respect to said first axis by said first and second portions.

16. The optical interface of claim 15, wherein said WFE comprises different coatings along said parallel surface, a first coating is configured as an antireflective coating for a first signal, a second coating is configured as a selective filter for reflecting a second signal but transmitting said first second, a third coating is configured as a reflective coating for said second signal, and a fourth coating is configured as a selective filter for reflecting said first signal but transmitting said second signal.

17. The optical interface of claim 1, wherein said first and second portions are configured to hold said WFE.

18. The optical interface of claim 17, wherein said first and second portions define a cavity configured to hold said WFE in angular alignment with said axes.

19. The optical interface of claim 18, wherein said cavity has one or more register surfaces configured to hold said WFE in angular alignment with said axes.

20. The optical interface of claim 19, wherein said cavity is internal to said first and second portions.

21. An optical assembly, comprising:
    an optical interface comprising at least:
        a first portion having at least one optical conduit interface with a first axis for optically coupling with at least one optical conduit;
        a second portion having at least one transmitter interface with a second axis for optically coupling with a transmitting optical device, and at least one receiver interface with a third axis for optical coupling with a receiving optical device, said first, second and third axes being essentially parallel; and
        a wavelength filter element (WFE), said WFE being a single component discrete from first and second portions, said WFE being held in place by said first and second portions, said WFE defining a first optical path between said transmitter interface and said optical conduit interface, and a second optical path between said optical conduit interface and said receiver interface;
    a substrate defining a planar surface essentially perpendicular to said first, second and third axes, said optical interface being disposed on said planar surface;
    at least one transmitting optical device optically coupled with said transmitter interface;
    at least one receiving optical device optically coupled with said receiver interface;
    a transmitter driver mounted on said substrate, adjacent said transmitting optical device;
    a receiver driver mounted on said substrate, adjacent said receiving optical device;
    at least one circuit board comprising transmitter circuitry and receiver circuitry, said circuit board being essentially parallel to said axes; and
    at least one flexible circuit electrically connecting said transmitter driver to said transmitter circuitry, and connecting said receiver driver to said receiver circuitry.

22. The optical assembly of claim 21, wherein said at least one transmitting optical device is a plurality of transmitting optical devices arranged as a transmitter array, and said at least one receiving optical device is a plurality of receiving optical device arranged as a receiver array, and wherein said transmitter and receiver arrays are mounted on a chip, said chip mounted on said planar surface.

23. The optical assembly of claim 21, wherein said first and second portions define alignment pin holes and said substrate defines alignment pin holes, and further comprising alignment pins disposed in said alignment pin holes, thereby aligning said first and second portions with said substrate.

24. The optical assembly of claim 21, wherein said flexible circuit is a single component.

25. The optical assembly of claim 21, further comprising a frame for holding said substrate and said at least one circuit board.

26. The optical assembly of claim 25, wherein said frame comprises alignment pin holes and wherein said alignment pin is disposed in said alignment pin holes.

27. The optical assembly of claim 21, wherein at least one circuit board comprises a transmitter circuit board comprising said transmitter circuitry, and a receiver circuit board comprising said receiver circuitry.

28. The optical assembly of claim 27, wherein said at least one circuit board comprises a card edge connector.

29. A transceiver comprising:
an optical assembly comprising at least:
  an optical interface comprising at least:
    a first portion having at least one optical conduit interface with a first axis for optically coupling with at least one optical conduit;
    a second portion having at least one transmitter interface with a second axis for optically coupling with a transmitting optical device, and at least one receiver interface with a third axis for optical coupling with a receiving optical device, said first, second and third axes being essentially parallel; and
    a wavelength filter element (WFE), said WFE being a single component discrete from first and second portions, said WFE being held in place by said first and second portions, said WFE defining a first optical path between said transmitter interface and said optical conduit interface, and a second optical path between said optical conduit interface and said receiver interface;
  a substrate defining a planar surface essentially perpendicular to said first, second and third axes, said optical interface being disposed on said planar surface;
  at least one transmitting optical device optically coupled with said transmitter interface;
  at least one receiving optical device optically coupled with said receiver interface;
  a transmitter driver mounted on said substrate, adjacent said transmitting optical device;
  a receiver driver mounted on said substrate, adjacent said receiving optical device;
  at least one circuit board comprising transmitter circuitry and receiver circuitry, said circuit board being essentially parallel to said axes; and
  at least one flexible circuit electrically connecting said transmitter driver to said transmitter circuitry, and connecting said receiver driver to said receiver circuitry;
a housing containing said optical assembly; and
an adapter adjacent said optical interface to receive an optical connector.

30. The transceiver of claim 29, wherein said housing comprising opening in rear to access a card edge connector on said at least one circuit board.

* * * * *